(12) United States Patent
Andersen

(10) Patent No.: US 10,433,650 B2
(45) Date of Patent: Oct. 8, 2019

(54) LINEAR DUAL ACTUATOR

(71) Applicant: LINAK A/S, Nordborg (DK)

(72) Inventor: Hans Gram Andersen, Tønder (DK)

(73) Assignee: LINAK A/S, Nordborg (DK)

( * ) Notice: Subject to any disclaimer, the term of this patent is extended or adjusted under 35 U.S.C. 154(b) by 142 days.

(21) Appl. No.: 15/504,931

(22) PCT Filed: Sep. 9, 2015

(86) PCT No.: PCT/DK2015/000036
§ 371 (c)(1),
(2) Date: Feb. 17, 2017

(87) PCT Pub. No.: WO2016/037621
PCT Pub. Date: Mar. 17, 2016

(65) Prior Publication Data
US 2017/0258240 A1 Sep. 14, 2017

(30) Foreign Application Priority Data
Sep. 9, 2014 (DK) .................................. 2014 00515

(51) Int. Cl.
*A47C 20/04* (2006.01)
*A47C 20/12* (2006.01)
(Continued)

(52) U.S. Cl.
CPC ............ *A47C 20/12* (2013.01); *A47C 20/041* (2013.01); *A47C 20/08* (2013.01); *A61G 7/015* (2013.01);
(Continued)

(58) Field of Classification Search
CPC .................................................... A47C 20/04
(Continued)

(56) References Cited

U.S. PATENT DOCUMENTS 5,075,911 A 12/1991 Dewert
5,528,449 A 6/1996 Koch
(Continued)

FOREIGN PATENT DOCUMENTS

DE 38 42 078 C2 7/1992
DE 20214426 3/2004
(Continued)

OTHER PUBLICATIONS

English Abstract of DE10340293 (DE20214426).
(Continued)

*Primary Examiner* — Fredrick C Conley
(74) *Attorney, Agent, or Firm* — Dykema Gossett PLLC

(57) ABSTRACT

Linear dual actuator for lying or sitting furniture having at least two sections (2,3), which with one end is rotatably embedded in the article of furniture and where each section (2,3) with an arm (5,7) secured to a pivot shaft (4,6) can be adjusted by means of the linear dual actuator. The dual actuator comprises a housing (8) with a drive at each end, which comprises an electric motor (11), which through a transmission (12) is in driving connection with a spindle (13). On the spindle (13) is arranged an activation element (14) with a spindle nut in engagement with the spindle (13), where the activation element (14) can be brought into engagement with the arm (5,7) for adjusting the sections (2,3). In case of power failure there is the problem that the back rest and leg rest section cannot be lowered to a plane level, which can make the bed uncomfortable or completely impossible to sleep in. This problem is solved in that a rotating element in the drives comprises a connection (21), which is accessible from the outer side of the housing (8) for connecting a tool, e.g. an Allen key (22) for driving the respective drives for the back rest and leg rest section (2,3) for lowering of these to a horizontal position.

12 Claims, 3 Drawing Sheets

Figure 1:
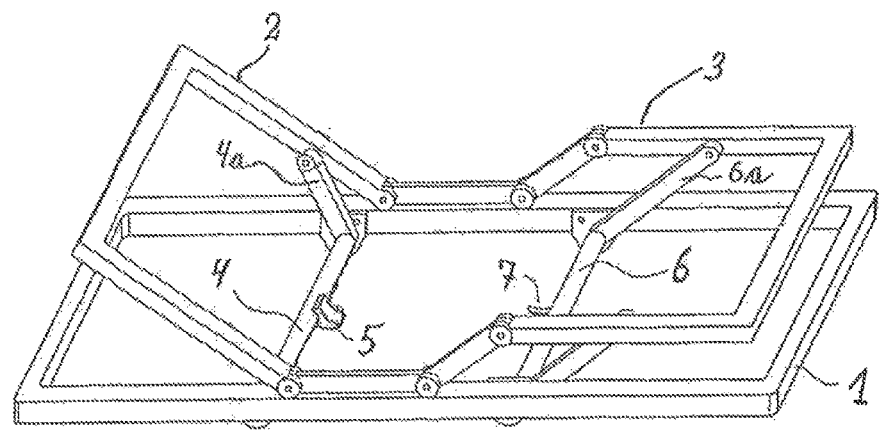

(51) Int. Cl.
*A47C 20/08* (2006.01)
*A61G 7/015* (2006.01)
*A61G 7/018* (2006.01)
*F16H 25/20* (2006.01)
*F16H 37/12* (2006.01)

(52) U.S. Cl.
CPC .............. *A61G 7/018* (2013.01); *F16H 25/20* (2013.01); *F16H 37/12* (2013.01); *F16H 2025/209* (2013.01); *F16H 2025/2043* (2013.01); *F16H 2025/2065* (2013.01)

(58) Field of Classification Search
USPC .............................................. 5/616–618, 620
See application file for complete search history.

(56) References Cited

U.S. PATENT DOCUMENTS

| | | | | |
|---|---|---|---|---|
| 5,939,803 | A | 8/1999 | Frost | |
| 7,471,020 | B2 | 12/2008 | Abrahamsen | |
| 2008/0271246 | A1* | 11/2008 | Nielsen | A47C 20/041 5/616 |
| 2009/0100951 | A1 | 4/2009 | Frost | |
| 2009/0151490 | A1* | 6/2009 | Kristensen | F16H 25/2015 74/89.37 |
| 2009/0301239 | A1* | 12/2009 | Heinrichs | A47C 20/041 74/89.37 |

FOREIGN PATENT DOCUMENTS

| | | |
|---|---|---|
| DE | 102004016050 | 10/2005 |
| DE | 202011110086 | 2/2013 |
| EP | 0 372 032 B2 | 3/2002 |
| JP | 2003184988 | 7/2003 |
| WO | 93/11593 A1 | 6/1993 |
| WO | 95/23450 A1 | 8/1995 |
| WO | 2004/018901 A1 | 3/2004 |
| WO | 2007/112745 A1 | 10/2007 |
| WO | 2012055256 | 5/2012 |

OTHER PUBLICATIONS

English Abstract of DE102004016050.
English Abstract of JP2003184988.
English Abstract of WO2012055256.

* cited by examiner

LINEAR DUAL ACTUATOR

The present invention relates to an electrically driven linear dual actuator for lying and sitting furniture, and the invention also relates to an article of lying or sitting furniture.

In the late 1980s there was a break-through within the area of beds with an adjustable back rest and leg rest section, as a linear dual actuator was launched, which as a separate unit could be mounted to the slatted frame of the bed, cf. for instance DE 38 42 078 C2 to Dietmar Koch and EP 0 372 032 B2 to Eckhart Dewert. The slatted frame has a transverse shaft for the back rest and leg rest section, respectively, on which the dual actuator can be suspended without interfering with the bed construction and without the use of tools. The introduction of this type of actuator for the private bed marked resulted in a significant interest for electrically adjustable beds, especially as the interest also was followed up with a concurrent product development in order to bring the price of the furniture down into a price range, which made these commonly available. A further product development has subsequently taken place, such that today there are also dual actuators for care beds with the special requirements connected therewith.

In certain countries there was however a widely held view that it was unsafe to sleep in these beds based on the argument that the dual actuators emitted electric and magnetic radiation, as they were constantly connected to mains, This problem was solved by means of a mains cut-off, which ensured that the dual actuator always was disconnected from mains and only was connected when the hand control for adjustment of the bed was operated. An example of such a mains cut-off is known from WO 93/11593 A1 to Dietmar Koch.

In case of power failure the problem exists that the back rest and leg rest section cannot be lowered to a plane level, which can make the bed uncomfortable or completely impossible to sleep in. This problem is sought solved with a common 9V battery as an emergency power battery, as this is sufficient to lower the back rest and leg rest to a plane level at least once. This battery is placed on the upper side of the dual actuator which makes it difficult to replace as it is located between the upper side of the dual actuator and the underside of the slatted frame, which does not leave much room for replacing the battery. The mains cut-off dealt with in WO 93/11593 A1 to Dietmar Koch requires a power supply for activating the relay, which connects the transformer-based power supply of the dual actuator to mains. The 9V battery is used for that purpose, which further serves as emergency power battery in case of power failure on the mains. This obviously entails that the battery can be partially discharged and thus not be able to lower the back rest and leg rest section to a plane level in case of drop-outs on the mains-based power supply. The problem with the discharging of the emergency power battery is in WO 95/23450 A1 to Linak A/S solved in that the energy for the mains cut-off comes from a capacitor instead of from the emergency power battery. The capacitor remains charged in that the dual actuator at intervals for a short duration connects for charging of the capacitor.

Thus, the mains cut-off does not use the power of the emergency power battery.

The problem in regard to the emergency lowering does however still exist and the previous solution with the emergency power battery did not take into account that the electrical system could be damaged or that damages could occur to the electrical system in the dual actuator.

The purpose of the invention is to provide a dual actuator, where the problem concerning emergency lowering outlined above is sought solved.

This is achieved according to the invention by constructing the dual actuator as stated in claim 1, namely in that a rotating element in the drives comprises a connection for tools, which is accessible from the outer side of the housing, for driving the respective drives for the back rest and leg rest section for lowering these to a horizontal position. In principle a shaft could be extended such that it would protrude from the housing and be equipped with a handwheel. It is however not expedient to have something protruding from the outer side of the housing .and particularly not something that rotates. In a preferred embodiment the connection is accessible in a recess in the housing, where the recess can be a regular channel with the connection located far inside of the housing. The connection can be located in the end of a shaft or in the side of a toothed wheel, where both solutions have their own advantages and disadvantages. The shafts are typically made of metal, for which reason a relatively durable connection can be shaped in or from an end of a shaft. Correspondingly, the toothed wheels are typically, out of consideration for noise, made from plastic, but here it is possible to make the connection larger such that it can transfer a larger torque and is thus less exposed to overload. The connection can either be designed such that the end of a tool can be inserted into a hollow in this or the connection can be designed such that the end of a tool is placed over this. The tool can simply be an Allen key or a socket wrench. As an alternative to a hand-operated Allen key or socket wrench an electric screw driver can be used. Expediently, the connections are accessible from the underside of the housing of the dual actuator, as the underside usually will be directly accessible.

The invention further relates to an article of lying or sitting furniture as stated in claim 11, and which comprises at least two sections, where each section with one end is rotatably embedded around a horizontal axis in the article of furniture, a pivot shaft with an arm in connection with each section, and a linear dual actuator according to one or more of the claims 1-10 mounted on the pivot shafts such that the arm on the respective pivot shafts is in or can be brought into engagement with the respective sliding elements in the dual actuator.

Figure 2:
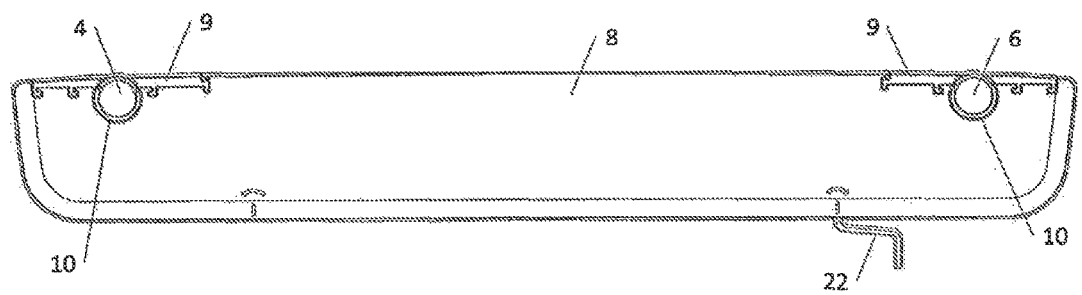
Figure 3:
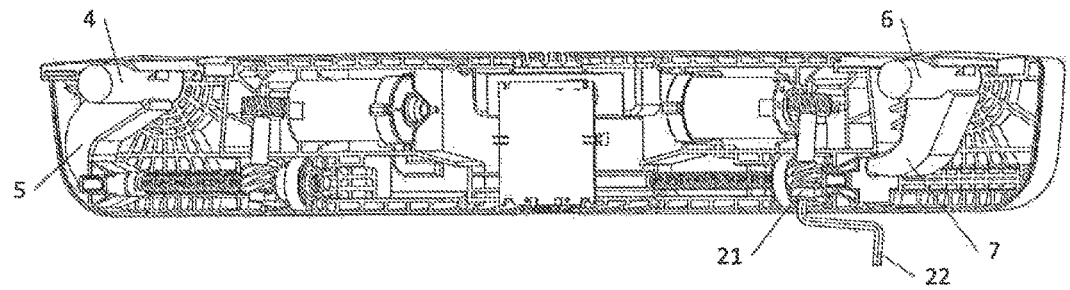
Figure 4:
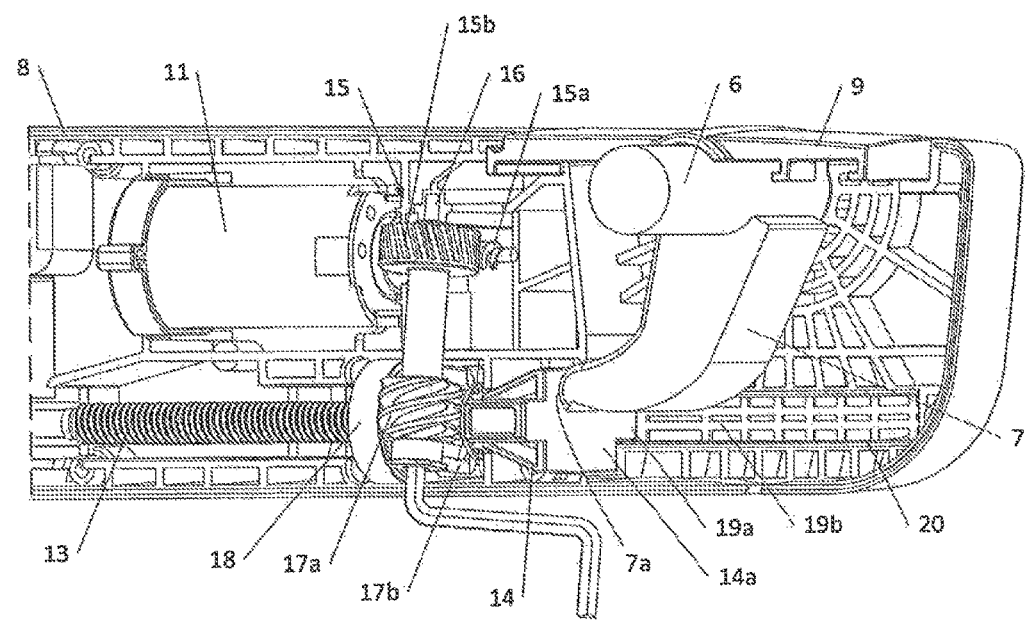
Figure 5:
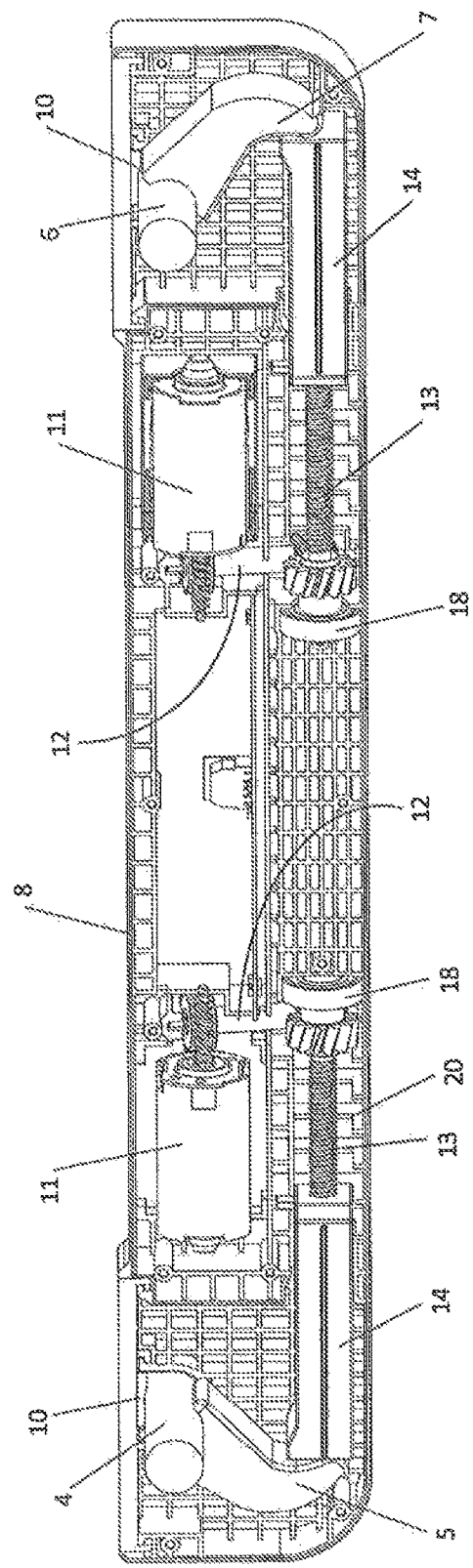

An example of a slatted frame and dual actuator will be described more fully below with reference to the accompanying drawing. The drawing shows:

FIG. 1, a slatted frame shown with raised back and leg rest section,

FIG. 2, a dual actuator seen from the side,

FIG. 3, a longitudinal section through the dual actuator seen from the side and one end, FIG. 4, a longitudinal section through one end of the dual actuator seen directly from the side, and FIG. 5, a longitudinal section through a second embodiment of the dual actuator according to the invention.

The slatted frame shown in FIG. 1 comprises a frame 1 in which a back rest section 2 and an articulated leg rest section 3 are embedded. For the back rest section 2 a transversal shaft 4 is embedded in the frame, on which shaft an arm 5 is secured. On each end of the shaft 4 a rod 4a connected to the back rest section 2 is mounted, which with the end towards the middle of the frame 1 is rotatably embedded in this. In a corresponding manner there is a transversal shaft 6 with an arm 7 for the leg rest section 3, which likewise with the end towards the middle of the frame 1 is rotatably embedded in this.

Correspondingly, a rod 6a on the end of the shaft 6 is connected to the leg rest section 3.

The movement of the back rest and leg rest section 2,3 is brought about by means of a dual actuator as shown in FIGS. 2 and 3. The dual actuator comprises a housing 8 with a drive and an opening cover 9 at each end. As reference is made to the end of the dual actuator which operates the leg rest section, the cover 9 gives access to a recess 10 in the side walls of the housing for the transversal shaft 6 for the leg rest section 3. As mentioned, a drive comprising an electric motor 11 is located in connection with the recess 10. Through a transmission 12 the electric motor 11 axially displaces a spindle 13, where one end of the spindle 13 is equipped with an activation element 14. As it appears the electric motor 11 is located horizontally over and axis-aligned with the spindle 13. The transmission 12 comprises a first worm gear 15, where the worm 15a is provided in continuation of the motor shaft. The worm 15a is in engagement with a worm wheel 15b located next to the worm 15a. This worm wheel 15b is mounted on a vertical shaft 16 embedded in the housing 8. The transmission further comprises a second worm gear 17, where the worm 17a is mounted in the opposite end of the shaft 16 as the worm wheel 15b. The worm 17a is in engagement with a worm wheel 17b, which with a ball bearing 18 is embedded in the housing. In the center of the worm wheel 17b a spindle nut in engagement with the spindle 13 is secured. When the worm wheel and thus the spindle nut is rotated, the spindle 13 and the activation element 14 connected thereto will be displaced axially in one or the other direction depending on the direction, of rotation of the spindle nut. It is noted that the activation element 14 is guided in a guideway 20 in the housing 8 and has a pair of guiders 19a, resting in a track 19b for that purpose in the side walls of the guideway and are thus secured against rotation. The front end 14a of the activation element 14 is designed as a contact surface for the arm 7 on the shaft 4 of the leg rest section 3. With its free end 7a the arm 7 loosely engages the end 14a of the activation element 14. When the activation element is moved towards the end of the housing 8 it pushes with the front end 14a against the arm 7 on the shaft 6, such that the leg rest section 3 is raised. Correspondingly, when the activation element 14 is moved towards the middle of the housing 8, the leg rest section 3 will be lowered, as the load from the leg rest section 3 will press the end of the arm 7a against the front end 14a of the activation element 14.

In case of power failure from the mains or an electrical error in the dual actuator for instance in its power supply or operation device, this is equipped with an emergency lowering. The emergency lowering comprises a connection 21 for an Allen key 22. This connection 21 is arranged in a lower end of the shaft 16 and is accessible through an opening 23 in the bottom of the housing 8. By inserting the end of the Allen key 22 into the connection 21 and turning the Allen key 22, the drive is moved. It is immediately recognized on the force required to turn the Allen key 22 whether the respective section is lowered or attempted to be raised. All things equal the force needed to lower the section will be much smaller than if one would attempt to raise it. The side of the housing 8 can be provided with an indication for, where on the bottom of the housing 8 the Allen key 22 should be inserted into the housing 8.

The drive and the end of the housing 8 in the other end of the dual actuator are constructed in a corresponding manner and operate the back rest section 2.

The actuator is mounted on the slatted frame by pulling the covers 9 outwards and leading the actuator up until the shafts 4,6 rest in the recesses 10, and the arms 5,7 on the shafts reach down in front of the activation elements 14. The covers 9 are closed again, by which the actuator is suspended on the shafts 4,6.

The dual actuator shown in FIG. 5 of the drawing solely differs from the dual actuator described above by the inverse function of the spindle unit, i.e. in that the spindle 13 with one end is embedded in the housing 8 with a ball bearing 18 and that the activation element 14 is secured to the spindle nut. When the spindle is rotated the spindle nut and thus the activation element 14 will be displaced axially in one or the other direction depending on the direction of rotation of the spindle. The emergency lowering is arranged in a manner corresponding to the embodiment above. In the drawing the same reference numerals are used for the same components as above.

The invention thus provides a dual actuator, where an emergency lowering of both the back rest as well as the leg rest section to a horizontal position can be performed in a simple manner regardless of whether it is due to mains power failure or an electrical error in the dual actuator or operation device.

The invention claimed is:

1. A linear dual actuator dedicated for lying or sitting furniture of the type comprising at least one section (2,3), which with one end is rotatably embedded around an axis in the article of furniture, and where the section (2,3) can be adjusted by means of a pivot shaft (4,6) directly or indirectly connected to the section (2,3), and where an arm (5,7) is secured to the pivot shaft (4,6) by which the pivot shaft (4,6) is brought to rotate and thus adjust the section (2,3), said dual actuator comprises a housing (8) with a recess (10) in each end for each of the pivot shafts (4,6) on the article of furniture, and where the arms (5,7) on the pivot shafts (4,6), after the dual actuator has been mounted, reach into the housing (8), and where each end of the housing (8) is furnished with a drive comprising an electric motor (11) a transmission (12) in driving connection with the electric motor (11), a spindle unit in driving connection with the transmission (12), and where the spindle unit comprises a spindle (13) and a spindle nut which can be displaced relative to each other, as well as an activation element (14) in connection with the spindle unit and which is guided in the housing (8) in a manner which is secured against rotation, and which can be brought into engagement with the arm (5,7) for adjusting the section (2,3), wherein a rotating element in the drives comprises a connection (21) for a tool, accessible from the outer side of the housing (8), to allow rotation of the rotating element of the drive when the tool is coupled to the connection and is rotated to thereby move the drive for driving the respective sections (2,3) for lowering the respective sections to a horizontal position.

2. The linear dual actuator according to claim 1, wherein the connection (21) is an extension of a shaft (16), which protrudes out of the housing (8).

3. The linear dual actuator according to claim 2, wherein the connection (21) is equipped with an operating handle, such as a hand.

4. The linear dual actuator according to claim 1, wherein the connection (21) is accessible in a recess in the housing (8), where the recess can be a regular channel with the connection located inside of the housing (8).

5. The linear dual actuator according to claim 1, wherein the connection (21) is located in or on the side of a toothed wheel.

6. The linear dual actuator according to claim 1, wherein the connection (21) is designed such that the end of a tool can be inserted into a hollow in the connection (19).

7. The linear dual actuator according to claim 1, wherein the connection (21) is designed such that the end of a tool can be placed thereover.

8. The linear dual actuator according to claim 1, wherein the tool is an Allen key (22).

9. The linear dual actuator according to claim 1, wherein the connection (21) is located on or is accessible from the underside of the housing (8) of the dual actuator.

10. The linear dual actuator according to claim 1, wherein the transmission (12) comprises a worm gear (15) where the worm (15a) is designed as an extension of the motor shaft, while the worm wheel (15b) is located horizontally on a shaft (16), which extends down to the spindle (13), and a second worm gear (17) with a worm (17a) on the end of the shaft (16) in engagement with a worm wheel (17b) on the spindle (13) and that the connection is designed in the end of the shaft (16), which faces towards the underside of the housing (8) and that the connection (21) is accessible from the underside of the housing (8).

11. An article of lying and/or sitting furniture comprising at least one section (2,3), which with one end is rotatably embedded around an axis in the article of furniture, and where the section (2,3) can be adjusted by means of a pivot shaft (4,6) directly or indirectly connected to the section (2,3), and where an arm (5,7) is secured to the pivot shaft (4,6) by which the pivot shaft (4,6) is brought to rotate and thus adjust the section (2,3), and a linear dual actuator according to claim 1 mounted on the pivot shafts (4,6) such that the arm (5,7) on the pivot shaft (4,6) is in or can be brought into engagement with a sliding element (18) in the dual actuator.

12. The article of lying and/or sitting furniture according to claim 11, wherein it comprises two adjustable sections (2,3), where each section (2,3) with one end is rotatably embedded around an axis in the article of furniture, and where each section (2,3) can be adjusted by means of the respective pivot shaft (4,6) directly or indirectly connected to the section (2,3), and where an arm (5,7) is secured to each pivot shaft (4,6) by which the pivot shaft (4,6) can be brought to rotate and thus adjust the respective sections (2,3).

* * * * *